(12) United States Patent
Puc (10) Patent No.: US 6,341,023 B1
(45) Date of Patent: Jan. 22, 2002

(54) MULTIPLE LEVEL MODULATION IN A WAVELENGTH-DIVISION MULTIPLEXING (WDM) SYSTEMS

(75) Inventor: Andrej B. Puc, Atlantic Highlands, NJ (US)

(73) Assignee: TyCom (US) Inc., Morristown, NJ (US)

(*) Notice: Subject to any disclaimer, the term of this patent is extended or adjusted under 35 U.S.C. 154(b) by 0 days.

(21) Appl. No.: 09/359,122

(22) Filed: Jul. 23, 1999

(51) Int. Cl.[7] ............................................. H04J 14/02

(52) U.S. Cl. ...................... 359/124; 359/186; 359/191

(58) Field of Search ............................... 359/124, 133, 359/181, 186, 173, 188, 191, 195

(56) References Cited

U.S. PATENT DOCUMENTS

| | | | |
|---|---|---|---|
| 5,351,148 A | * 9/1994 | Maeda et al. | 359/124 |
| 5,387,927 A | 2/1995 | Look et al. | 348/6 |
| 5,896,211 A | * 4/1999 | Watanabe | 359/124 |
| 5,926,301 A | 7/1999 | Hirt | 359/154 |

OTHER PUBLICATIONS

Haykin, Simon S., "Digital Communications", ISBN 0471–62947–2, 1988, pp. 313–318.

Walker, S.D. et al., "Multivariate Optimisation Criteria for Microwave Subcarrier PSK Optical Transmission Systems", pp. 11/1–11/4.

Pérez–Jiménez, R. et al., "Improved PPM schemes for IR–wireless LAN", Electronics Letters vol. 32, No. 10, May 9, 1996, pp. 885–887.

Hill, Paul et al., "Bandwidth Efficient Transmission of 4 Gb/s on Two Microwave QPSK Subcarriers over a 48 km Optical Link", IEEE Photonics Tech. Letters, vol. 2, No. 7, Jul. 1990, pp. 510–512.

Lachs, Gerard et al., "Multichannel Image–Rejection Coherent Detection System", Journal of Lightwave Tech., vol. 8, No. 12, Dec. 1990, pp. 1874–1881.

Hickey, Michael et al., "Experimental PSK/ASK Transceiver for the STARNET WDM Computer Communication Network", IEEE Photonics Tech. Letters vol. 5, No. 5, May 1993, pp. 568–571.

Hojoon, Lee et al., "Impact of four wave mixing on Manchester Coded optical WDM communication systems", Stanford University, SPIE vol. 1787 Multigigabit Fiber Comm. 1992, pp. 267–280.

Kagi, N. et al., "Cross Phase Modulation in Fiber Links with Optical Amplifiers", Stanford University, Dept. of Electrical Engineering, pp. 188–189.

Iannone, P.P. et al., "Simultaneous WDM and Broadcast Transmission Using a Single Multiwavelength Waveguide––Granting–Router Laser", IEEE Photonics Tech. Letters vol. 8, No. 10, Oct. 1996, pp. 1397–1399.

Tanaka, Yuichi et al., "Optical Multi–Wavelength PPM for high data rate transmission on indoor channels", Keio University, 1997, pp. 978–983.

Ting–Kuang Chiang et al., "Implementation of STARNET: A WDM Computer Communications Network", IEEE Journal on Selected Areas in Comm., vol. 14, No. 5, Jun. 1996, pp. 824–839.

(List continued on next page.)

Primary Examiner—Kinfe-Michael Negash (57) ABSTRACT

Optical signals modulated with data are transmitted into a fiber link having a property of including nonlinear distortion of the optical signals as a function of signal power of the optical signals and distance traversed in the fiber link. The data is formatted with multiple-level signaling having a preselected M value to produce formatted data signals. The formatted data signals are multiplexed to produce wavelength-division multiplex (WDM) channels each carrying optical signals based on the formatted data signals. The preselected M value is based on signal jitter and maximum signal power.

29 Claims, 7 Drawing Sheets

OTHER PUBLICATIONS

Audeh, Malik D. et al., "Performance of Pulse–Position Modulation on Measured Non–Directed Indoor Infrared Channels", IEEE Transactions on Comm. vol. 44, No. 6, Jun. 1996, pp. 654–659.

Patent Abstracts Of Japan, vol. 1998, No.05, Apr. 30, 1998 & JP 10 013342 (Nippon Telegr 7 Amp; Teleph Corp & LT; NTT >), Jan. 16, 1998, Abstract.

* cited by examiner

MULTIPLE LEVEL MODULATION IN A WAVELENGTH-DIVISION MULTIPLEXING (WDM) SYSTEMS

BACKGROUND OF THE INVENTION

The present invention relates generally to fiber-optic communication systems. More specifically, the present invention relates to multiple-level modulation in a wavelength-division multiplexing (WDM) optical systems.

Multiple-level modulation schemes have been used in optical systems to a limited extent. For example, one optical system has been considered where pulse-position modulation (PPM) was implemented at 2, 4, 8 and 16 levels, at bit rates of 10 Mb/s and 30 Mb/s over non-directive, indoor, infrared channels. See Audel, M. D., et al., "Performance of Pulse-Position Modulation on Measured Non-Directed Indoor Infrared Channels," *IEEE Transactions on Communications*, Vol. 44, No. 6, June 1996. This type of indoor infrared link has a relatively short distance and relatively low noise; multiple path interference is a predominate impairment.

Multiple-level modulation schemes have also been used in microwave systems where signals are converted to optical wavelengths for intermediate transmissions. In one such system, microwave frequency signals are converted to optical subcarriers using multiple-level, phase-shift key (PSK) modulation. See Walker, S. D. et al., "Multivariate Optimisation Criteria for Microwave Subcarrier PSK Optical Transmission Systems," *IEE Colloquium on 'Microwave Optoelectronics'* (Digest No. 139), pp. 11/1–4, 1990. Again, this system transmits the optical signals over a link having a relatively short distance and a relatively low noise.

These types of systems, however, cannot be used effectively over links having different characteristics, such as highly non-linear, non-repeatered links over relatively long distances. Systems requiring the preservation of optical carrier phase over the link cannot be used over links having relatively long distances. Such systems include for example coherent systems, systems using multiple-level quadrature amplitude modulation (QAM), and systems using multiple-level phase shift key (PSK) on an optical carrier.

Multiple-level intensity signaling systems also suffer insurmountable problems associated with their respective "symbol-to-noise" ratio over nonlinear links. In such links, the noise accumulates over the length of the respective links. The signal power, however, cannot be increased beyond a certain point due to the increase in nonlinear distortion of the optical signals. Consequently, beyond this point where the signal power cannot be increased without increasing the noise, the noise is prohibitively large so that the symbols cannot be effectively detected and the data cannot be recovered effectively. In other words, symbol-to-noise ratio reaches a peak for a certain signal power beyond which the noise increases and the symbol-to-noise ratio decreases as the signal power increases.

SUMMARY OF THE INVENTION

Embodiments of the present invention address the shortcomings of the known applications of multiple-level modulation over nonlinear links having relatively long distances. Optical signals modulated with data are transmitted into a fiber link having a property of including nonlinear distortion of the optical signals as a function of signal power of the optical signals and distance traversed in the fiber link. The data is formatted with multiple-level signaling having a preselected M value to produce formatted data signals. The formatted data signals are multiplexed to produce wavelength-division multiplex (WDM) channels each carrying optical signals based on the formatted data signals. The preselected M value is based on signal jitter and maximum signal power.

BRIEF DESCRIPTION OF THE DRAWINGS

The various features of the invention will best be appreciated by simultaneous reference to the description that follows and the accompanying drawings, in which.

DETAILED DESCRIPTION

As discussed above in the "Background of the Invention" section, multiple-level modulation schemes have been used in optical systems having links with short distances and being relatively free of noise. Historically, multiple-level modulation schemes have been used to reduce the line rate and line bandwidth associated with an optical system. In other words, the greater the number of modulation levels, the lower the corresponding line rate and, consequently, the lower the corresponding line bandwidth. This reduction line bandwidth results in less noise in a receiver system; this benefit can be referred to as the "modulation gain". In other words, a particular multiple-level modulation scheme can provide an associated gain referred to herein as the modulation gain.

As the number of modulation levels (i.e., the M value) is increased, however, the symbol-to-noise ratio decreases due to the decrease in modulation depth associated with the signaling—the greater the M value, the lower the effective symbol-to-noise ratio. Although optical systems with short-distance links historically merely increased the signal-power per channel to overcome the noise due to the decreased effective symbol-to-noise ratio, this will not work for WDM systems transmitting on long distant links (e.g., transoceanic links) where an increase in signal power results in increased nonlinear distortion that destroys the M-ary information. Consequently, these known multiple-level modulation schemes cannot be applied to wavelength-division multiplexing (WDM) optical systems having highly nonlinear links with relatively long distances.

The present invention recognizes that certain multiple-level modulation schemes having an appropriate preselected M value can provide for signal-to-noise ratio (SNR) improvements over binary signaling in addition to a reduction in the line rate and the line bandwidth over binary signaling. More specifically, certain modulation schemes, such as phase shifted keyed (PSK) on an optical subcarrier and pulse-position modulation (PPM), can provide a modulation gain that can offset any loss due to nonlinear distortion associated with the respective modulation scheme. This can be particularly effective when combined with forward error correction (FEC) coding that can allow for a lower signal power per channel and, consequently, can provide a more linear system.

Said another way, certain multiple-level modulation schemes at particular modulation levels (i.e., at appropriate preselected M values) can provide a modulation gain that allows optical signals to be transmitted at a sufficiently low signal power per channel so that the associated nonlinear penalties are lower than the gain associated with a particular M-ary scheme. The penalty associated with the modulation scheme is the result of an increase in nonlinear distortion (i.e., an increase with respect to binary signals) experienced by the optical signals when transmitted over a nonlinear optical link. The specific penalty due to nonlinear distortion is a function of the specific modulation scheme, the signal spectrum and the signal power per channel. The particular modulation schemes at specific modulation levels that provide more modulation gain than the associated increase in nonlineear distortion can be used in WDM optical system having nonlinear optical links, thereby providing greater channel density than would otherwise be possible.

Figure 1:
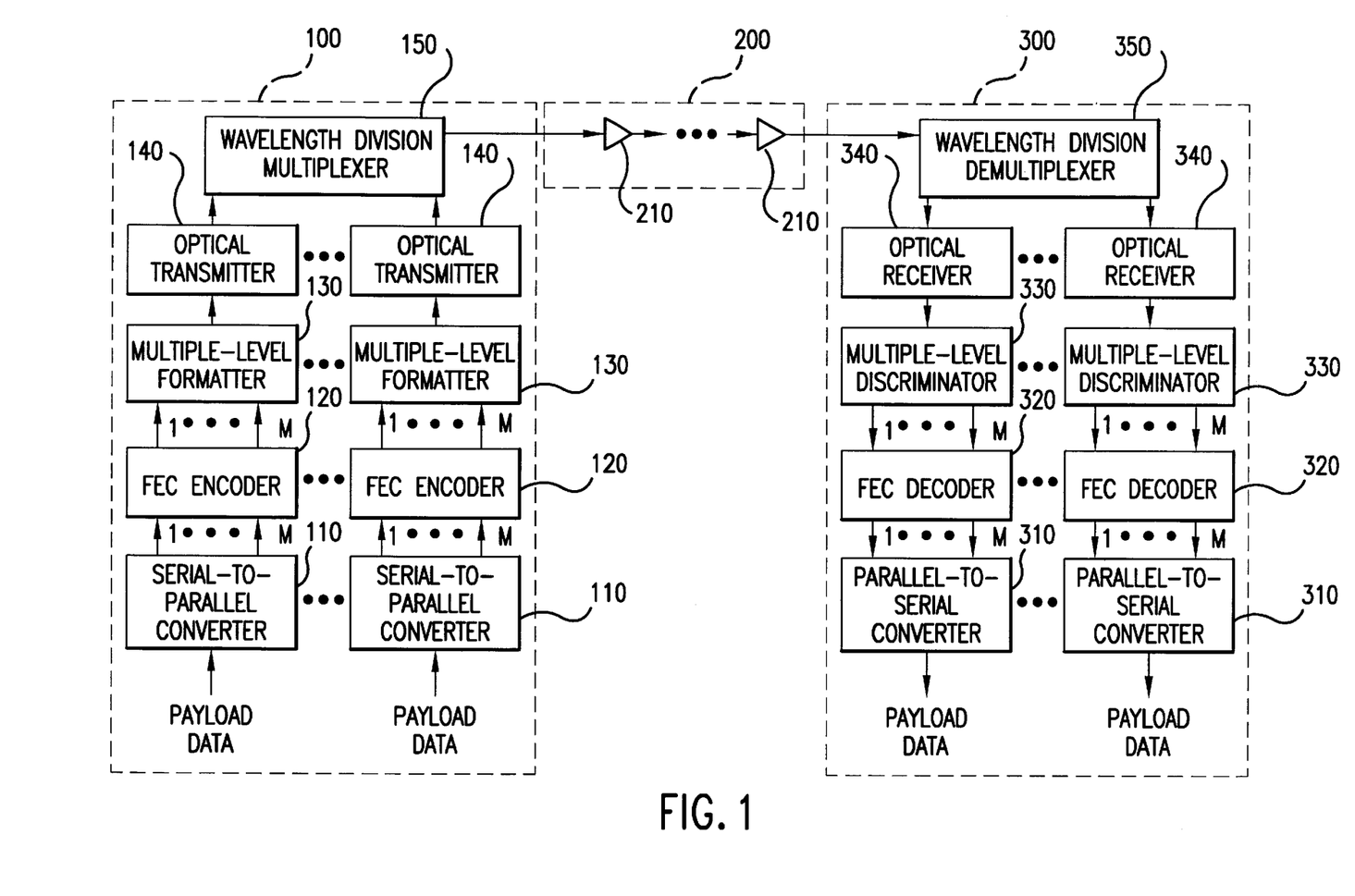
FIG. 1 illustrates a system block diagram of an optical communication system according to an embodiment of the present invention.

FIG. 1 illustrates a system block diagram of an optical communication system according to an embodiment of the present invention. Transmitter system 100 is connected to fiber link 200 which is connected, in turn, to receiver system 300. Transmitter system 100 includes a series of serial-to-parallel converters 110, FEC encoders 120, multiple-level formatters 130 and digital transmitters 140 connected to a wavelength division multiplexer 150. For each WDM channel, a serial-to-parallel converter 11 0, an FEC encoder 120, and a multiple-level formatter 130 are connected in series to an optical transmitter 140 which, in turn, is connected to wavelength division multiplexer 150. In other words, wavelength division multiplexer 150 receives signals associated with multiple WDM channels, each of which has an associated optical transmitter 140, a multiple-level formatter 130, an FEC encoder 120, and a serial-to-parallel converter 110.

Serial-to-parallel converters 110 can be any type of component that converts the payload data into parallel channels of data. The serial-to-parallel converters 110 can be, for example, a set of shift registers. Note that the transmitter system configuration (and receiver system configuration discussed below) allow parallel signal processing. In alternative embodiments, the transmitter system and receiver system can be configured in series so that the transmitter system has a single FEC encoder, multiple-level formatter and optical transmitter, and so that the receiver system has a single optical receiver, multiple-level discriminator and FEC decoder.

FEC encoders 120 can be any type of encoder that provides a coding gain based on signal redundancy. The specific coding gain provided by FEC encoders 120, of course, will depend upon the particular system parameters and the specific fiber link. For example, for particularly long fiber links, such as transoceanic fiber links, the coding gain can be higher than would be the case for a shorter fiber link. Note that FEC encoders 120 are optional and are not included in some embodiments of the present invention. Examples of appropriate FEC encoders are discussed in the commonly assigned, pending patent application entitled "Method and Apparatus for Improving Spectral Efficiency in Fiber-Optic Communication Systems" (Attorney Docket Pilipetskii 1-1 [10349/4081]) the entire contents of which are incorporated herein by reference for background purposes.

Multiple-level formatters 130 can be any type of appropriate electrical or optical circuits or a combination of both that format the data with a multiple-level format. The multiple-level formatters 130 convert binary data to M-ary symbols corresponding to the preselected M value as discussed below in reference to FIGS. 5 and 6. One embodiment of a multiple-level formatter is discussed in reference to FIG. 2 below.

Optical transmitter 140 converts electrical signals to appropriately conditioned optical signals. For example, optical transmitter 140 can include an optical source such as a semiconductor laser or a light-emitting diode which can be modulated directly by, for example, varying the injection current. For embodiments of the present invention where the multiple-level formatter 130 is an M-ary pulse position modulator (PPM), the optical transmitter 140 can be a return-to-zero (RZ)/subcarrier line transmitter. For embodiments of the present invention where the multiple-level formatter 130 is an M-ary phase-shift key (PSK) modulator, the optical transmitter 140 can be based on an intensity-modulated optical source having a microwave subcarrier.

WDM multiplexer 150 can be any type of device that combines signals from multiple WDM channels. For example, WDM multiplexer 150 can be a star coupler, a fiber Fabry-Perot filter, an in-line Bragg grating, a diffraction grating, cascaded filters and a wavelength grating router, among others.

Fiber link 200 can include, for example, optical amplifiers 210 interconnected by optical fiber. Fiber link 200 has such properties as to induce nonlinear distortion of propagating optical signals as a function of the signal power of the optical signals and the distance traversed. The causes of the nonlinear distortion of propagated optical signals in fiber link 200 include, but are not limited to, the Kerr effect, Brillouin scattering and Raman scattering. The length of fiber link 200, for example, can span distances of 1,500 km or greater. Said another way, fiber 200 can have such a length of that the optical transmitter sending optical signals to fiber 200 has a total output power of, for example, greater than 15 dBm.

Receiver system 300 includes a series of parallel-to-serial converters 310, FEC decoders 320, multiple-level discriminators 330, optical receivers 340 and a wavelength division demultiplexer 350.

Parallel-to-serial converters 310 can be any type of component that converts the parallel channels of data into the recovered payload data. The parallel-to-serial converters 310 can be, for example, a set of shift registers.

Multiple-level discriminators 330 can be any type of appropriate components that decode the data from its multiple-level format. In other words, the multiple-level discriminators 330 modify the multiple-level pulse shapes of the data (having the preselected M value corresponding to the M value used to format the data at the transmitter system 100) so that the data is binary data. One embodiment of a multiple-level discriminator within a PPM-PLL receiver or a PSK receiver is discussed in reference to FIG. 3 below. One embodiment of a multiple-level discriminator within a PPM-PDM receiver is discussed in reference to FIG. 4 below.

An FEC decoder 320 can include, but is not limited to, a multiple-level soft-decision circuit (e.g., a four level or eight level decision circuit) followed by a priority decoder, a Viterbi decoder with de-interlever and a Reed Solomon decoder (255, 239; T=8). The decoder circuit can be, for example, the LSI Logic commercial VLSI IC type L64709. Similar to the FEC encoders 120, FEC decoders 320 are optional and are not included in some embodiments of the present invention. An optical receiver 340 can be, for example, a direct detection automatic gain control (AGC) receiver.

WDM demultiplexer 350 can be any type of device that separates signals from multiple WDM channels. For example, WDM demultiplexer 350 can be a star coupler, a fiber Fabry-Perot filter, an in-line Bragg grating, a diffraction grating, cascaded filters and a wavelength grating router, among others.

Figure 2:
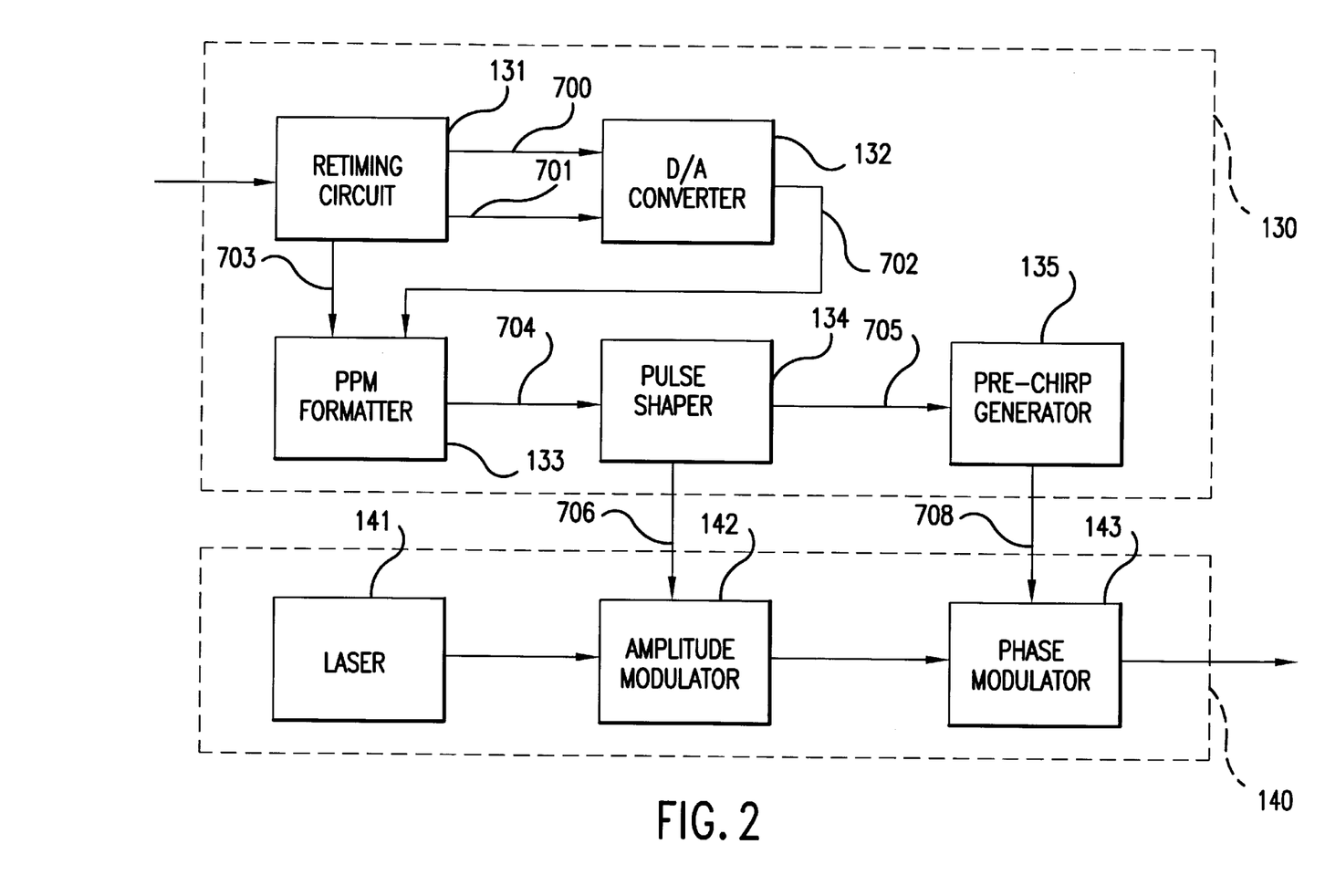
FIG. 2 illustrates a multiple-level encoder and an optical transmitter of a transmitter system, according to an embodiment of the present invention.

FIG. 2 illustrates a multiple-level formatter and an optical transmitter of a transmitter system, according to an embodiment of the present invention. The multiple-level formatter and optical transmitter shown in FIG. 2 are configured to transmit optical signals having a PPM modulation scheme.

As shown in FIG. 2, multiple-level formatter 130 includes retiming circuit 131, digital-to-analog (D/A) converter 132, PPM formatter 133, pulse shaper 134 and pre-chirp generator 135. Retiming circuit 131 is coupled to D/A converter 132 by lines 700 and 701. Retiming circuit 131 is coupled to PPM formatter 134 by line 703 and D/A converter 132 is coupled to PPM formatter 133 by line 702. PPM formatter 133 is coupled to pulse shaper 134 by line 704. Pulse shaper 134 is coupled to pre-chirp generator 135 by line 705. Note that pre-chirp generator 135 is optional; in embodiments where the pre-chirp generator is not present, the phase modulator of the optical transmitter is also not present and can be replace by a polarization scrambler.

Optical transmitter 140 includes laser 141, amplitude modulator 142 and phase modulator 143. Laser 141 is coupled to amplitude modulator 142, which is in turn coupled to phase modulator 143. Multiple-level formatter 130 is coupled to optical transmitter 140 pulse shaper 134 and pre-chirp generator 135 being coupled to amplitude modulator 142 and phase modulator 143, respectively. In other words, pulse shaper 134 is coupled to amplitude modulator 142 by line 706; pre-chirp generator 135 is coupled phase modulator 143 by line 708.

The operation of multiple-level formatter 130 and optical transmitter 140 will be briefly discussed. Retiming circuit 131 receives data signals from FEC encoder 120 (not shown in FIG. 2) and produces a clock signal based on the data signal on line 700. Retiming circuit 131 also provides the data signals to D/A converter 132 via line 701. D/A converter 132 converts the data signals from digital to analog and provides the analog data signals to PPM formatter 133 via line 702. PPM formatter 133 also receives a one-half clock signal from retiming circuit on line 703.

PPM formatter 133 converts the data signals to PPM-formatted data signals which are provided to pulse shaper 134 via line 704. PPM formatter 133 formats the data signals by shifting the analog pulses in a manner corresponding to the M-ary value of the data signals. Pulse shaper 134 performs signal conditioning to the pulses received from the PPM formatter 133.

The laser 141 produces an optical carrier signal and can be a device such as a semiconductor laser or any other source of coherent light. The light produced by laser 141 can have a wavelength of, for example, 1.5 $\mu$m or any other wavelength appropriate for a communication system.

Amplitude modulator 142 modulates the amplitude of the light received from laser 141 based on the pulse train received from the pulse shaper 134. The amplitude modulator 142 can be, for example, a Mach Zender interferometer.

Phase modulator 143 modulates the phase of the signal received from amplitude modulator 142 based on the signal received from the pre-chirp generator 135. The phase modulator 143 can be, for example, lithium niobate planar waveguide with an electro-optical modulator. The pre-chirp generator 135 applies a controlled phase modulation onto the pulses received from the pulse shaper 134 to generate a pulse having a soliton-like performance once transmitted through fiber link 200. In other words, by modulating the phase of signals received from the amplitude modulator 142, the phase modulator 143 reduces nonlinear distortion associated with optical signals when propagating within the fiber link 200. The source of the nonlinear distortion includes the Kerr effect, Brillouin scattering and Raman scattering.

In alternative embodiments of the present invention, the pre-chirp generator (e.g., 135) and the phase modulator (e.g., 143) are not necessary. More specifically, in alternative embodiments where the transmitted optical signals are, for example, solitons or dispersion-managed solitons, pre-chirping the signal pulses are not needed. In other alternative embodiments having a low signal power per channel, for example, those embodiments using a FEC encoder with a large coding gain (e.g., greater than 9 dB), pre-chirping the signal pulses are not needed and, thus, the pre-chirp generator and the phase modulator are not needed.

The transmitter system discussed in connection with FIG. 2 (based on a PPM modulation scheme) can be alternatively configured as a transmitter system based on a PSK modulation using an optical subcarrier. By including an intensity modulator between the laser and the amplitude modulator (i.e., the laser being coupled to the intensity modulator which is, in turn, coupled to the amplitude modulator), multiple-level data having a PSK format can be produced on an optical subcarrier signal.

The optical subcarrier signal can be created by intensity modulating the optical carrier with a local-oscillator signal having a frequency lower than the carrier frequency. For example, the intensity of the carrier frequency can be modulated with a local-oscillator signal having a microwave frequency to produce an optical subcarrier. In one embodiment of the present invention, the frequency (or wavelength) of the optical subcarrier for each optical transmitter 140 varies slightly to reduce potential four-wave mixing (FWM) while the signals are propagating within the fiber link 200.

Figure 3:
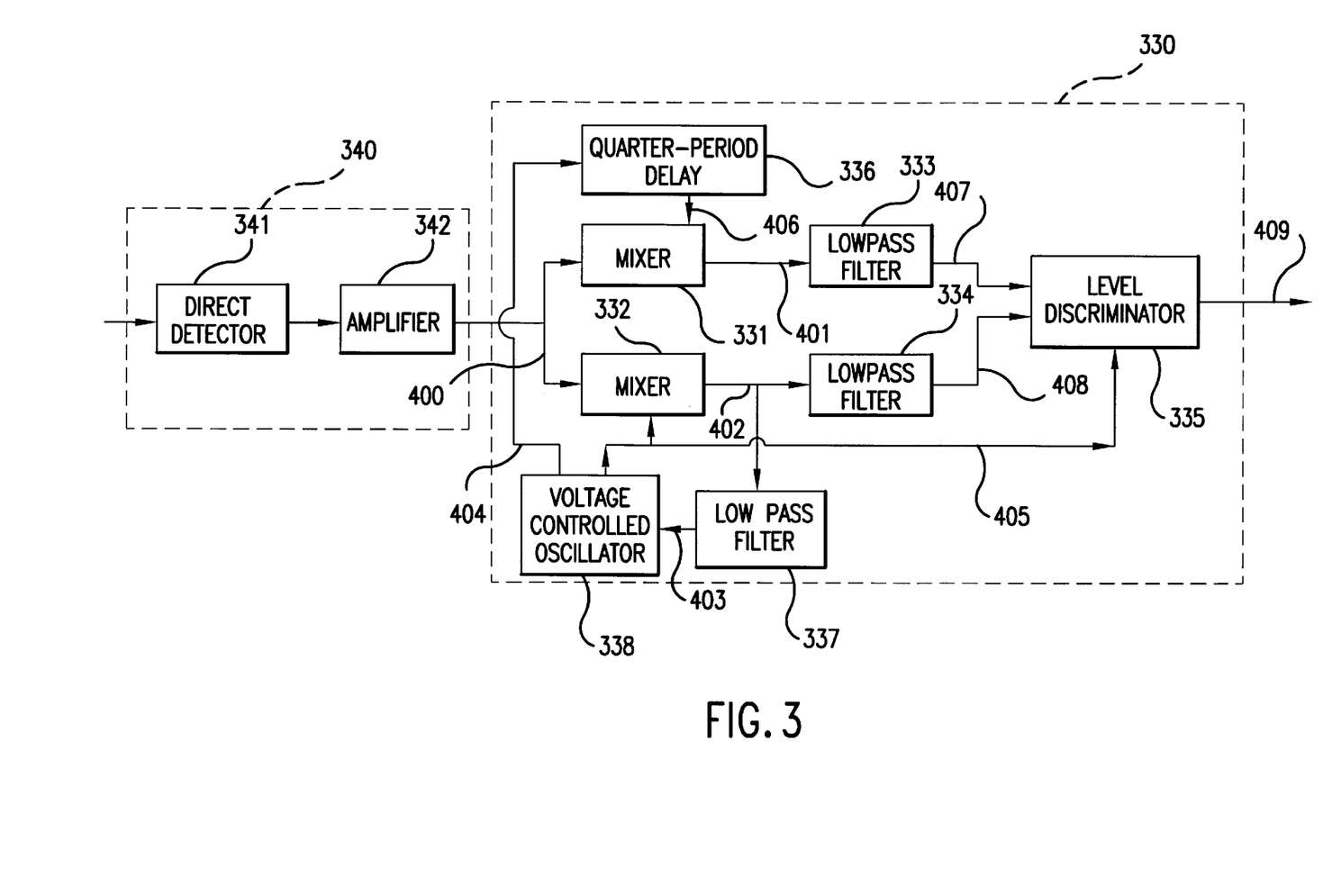
FIG. 3 illustrates an optical receiver and a multiple-level decoder of a receiver system, according to an embodiment of the present invention.

FIG. 3 illustrates an optical receiver and a multiple-level discriminator of a receiver system, according to an embodiment of the present invention. The optical receiver and a multiple-level discriminator shown in FIG. 3 are configured to receive optical signals having a PPM modulation scheme. The receiver system considered in reference to FIG. 3 is based on a phase-lock loop (PLL)(i.e., a phase discriminator in a PLL).

As shown in FIG. 3, optical receiver 340 includes direct detector 341 which is coupled to amplifier 342. Direct detector 341 receives data from wavelength division demultiplexer (such as 350 shown in FIG. 1) and converts the optical signals to electronic signals; amplifier 342 amplifies these electronic signals.

Amplifier 342 of optical receiver 340 is coupled to mixers 331 and 332 of multiple-level discriminator 330 by line 400. In addition to mixers 331 and 332, multiple-level discriminator 330 includes lowpass filters 333 and 334, level discriminator 335, quarter-period delay 336, low-pass filter 337 and voltage controlled oscillator (VCO) 338. In an alternative embodiment, lowpass filters 333 and 334 can be integrators.

Mixers 331 and 332 are coupled to lowpass filters 333 and 334 by lines 401 and 402, respectively. Mixer 332 is also coupled to low-pass filter 337 by line 402. Low-pass filter 337 is coupled to VCO 338 by line 403. VCO 338 is coupled to quarter-period delay 336 by line 404, to level discriminator 335 by line 405 and to mixer 332 by line 405. Quarter-period delay 336 is coupled to mixer 331 by line 406. Lowpass filters 333 and 334 are coupled to level discriminator 335 by lines 407 and 408, respectively. Level discriminator 335 produces output signals via line 409, which is coupled to a FEC decoder 320 (shown in FIG. 1).

The operation of the multiple-level discriminator 330 will now be briefly discussed. Parallel mixers 331 and 332 each mix the received signals with a clock signal to produce two signals that are proportional to the average phase difference between the respective received signal pulses and the clock signal. The clock signal is produced by low-pass filter 337 filtering the received signals on line 402 and by VCO 338 integrating the filter signals produced on line 403. The clock signal is produced by VCO 338 on lines 404 and 405.

Rather than using a single mixer, two parallel mixers can be used to improve the performance of the multiple-level discriminator 330. Mixers 331 and 332 each receive the clock signal where the clock signal received by mixer 331 is delayed by a quarter period (i.e., the reciprocal of the data repetition rate) from the clock signal received by mixer 332. In other words, the signals received on line 400 are split and mixed separately with a clock signal having a respective phase offset ninety degrees. The signals produced by these parallel mixers 331 and 332 on lines 407 and 408, respectively, can be filtered by lowpass filters 333 and 334, respectively.

Level discriminator 335 receives the mixed and filtered signals via lines 407 and 408, and receives the clock signal via line 405 to produce the output signal on line 409. The level discriminator 335 can be, for example, a decision circuit that recovers the binary data from the received multiple-level formatted data. Once the binary data has been recovered, the binary data can be provided to the a FEC decoder 320 (shown in FIG. 1) and, in turn, to the parallel-to-serial converters 310 (shown in FIG. 1) which outputs the recovered payload data.

Although the embodiment of the receiver system discussed in reference to FIG. 3 is described as a PPM receiver having a PLL discriminator, this embodiment can be characterized as a simplified PSK receiver system. An embodiment of a receiver system configured specifically as a PSK receiver system is expected to have a similar performance as a PPM receiver having a PLL discriminator. These embodiments of the receiver system can be relatively tolerant to intensity-envelope jitter and to chromatic dispersion that accumulates over the length of fiber link 200.

Figure 4:
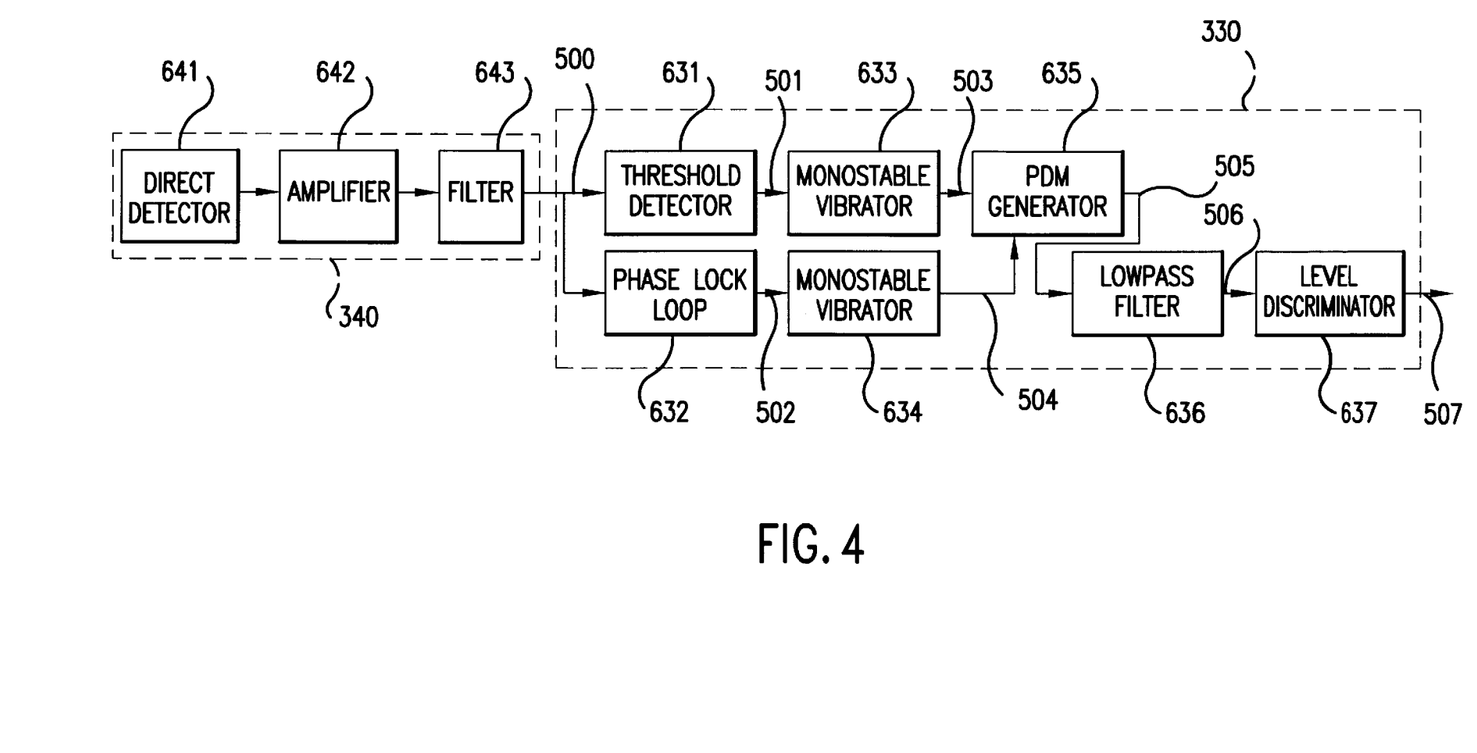
FIG. 4 illustrates an optical receiver and a multiple-level decoder of a receiver system, according to another embodiment of the present invention.

FIG. 4 illustrates an optical receiver and a multiple-level decoder of a receiver system, according to another embodiment of the present invention. The optical receiver and a multiple-level decoder shown in FIG. 4 are configured to receive optical signals having a PPM modulation scheme is based on a pulse-duration modulation (PDM) discriminator.

As shown in FIG. 4, optical receiver 340 includes direct detector 641, amplifier 642, and filter 643. Direct detector 641 is coupled to amplifier 642 which is, in turn, coupled to filter 643.

The filter 643 of optical receiver 340 is coupled to threshold detector 631 and phase lock loop 632 by line 500. In addition to threshold detector 631 and PLL 632, multiple-level discriminator 330 includes monostable vibrators 633 and 634, pulse duration modulation (PDM) generator 635, lowpass filter 636 and level discriminator 637.

Threshold detector 631 is coupled to monostable vibrator 633 by line 501. PLL 632 is coupled to monostable vibrator 634 by line 502. Monostable vibrators 633 and 634 are coupled to PDM generator 635 by lines 503 and 504, respectively. PDM generator 635 is coupled to lowpass filter 636 by line 505. Lowpass filter 636 is coupled to level discriminator 637 by line 506. Level discriminator 637 produces output signals via line 507, which is coupled to FEC decoders 320 (not shown in FIG. 4).

The operation of the multiple-level discriminator 330 will now be briefly discussed. Threshold detector 631 receives data signals on line 500. The threshold detector 631 determines the occurrence of each leading edge of the data pulses by detecting when the intensity of each data pulse increases above a threshold. The monostable vibrator 633 then produces a pulse having a uniform pulse width and having a leading edge corresponding to the detected leading edge. In other words, for each detected leading edge, a pulse is produced having a pulse width related to the data rate (for example, one half of the corresponding period).

PLL 632 produces a clock signal based on the data signals received on line 500. PLL 632 can include, for example, a clock-extractor circuit having a low-pass filter followed by a delay component. Similar to monostable vibrator 633, monostable vibrator 634 produces pulses corresponding to the clock signal pulses and having uniform pulse widths.

Figure 5:
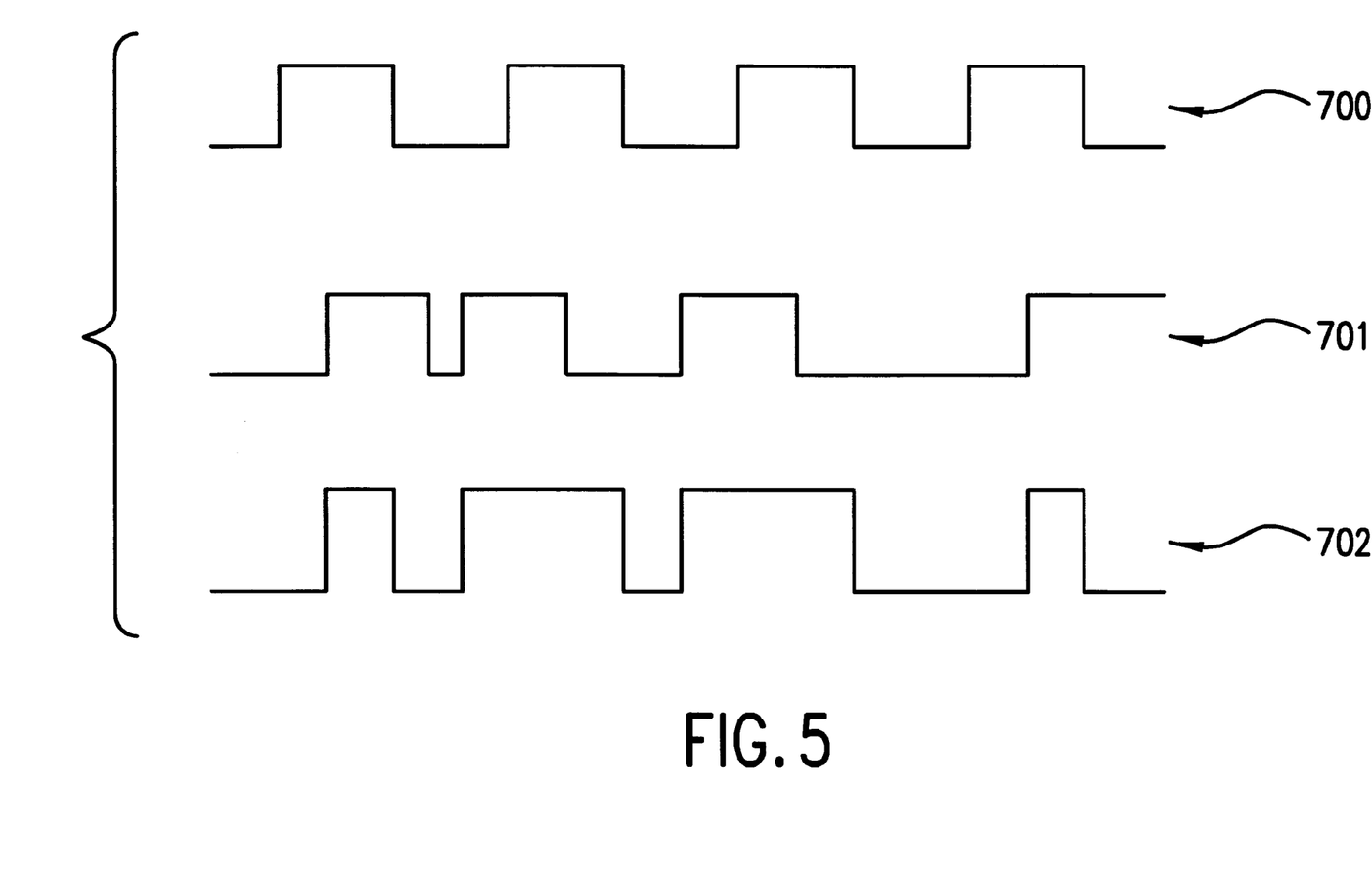
FIG. 5 illustrates examples of signals received by and produced by the PDM generator of a multiple-level discriminator shown in FIG. 4.

PDM generator 635 receives the pulses from line 503 (i.e., the pulse train corresponding to the received data signals) and the pulses from line 504 (i.e., the pulse train corresponding to the clock signal). The PDM generator 635 compares the phase of the leading edge of pulses received on line 503 to the phase of the trailing edge of pulses received on lin 504 to recover the data signals in a multiple-level format. PDM generator 635 can be, for example, a flip flop circuit with a negative reset. FIG. 5 illustrates an example of how the data signals in a multiple-level format are recovers.

FIG. 5 illustrates examples of signals received by and produced by the PDM generator of a multiple-level discriminator shown in FIG. 4. Signal 700 is an example of a clock signal received by PDM generator 635 received on line 504. Signal 701 is an example of a data signal received by PDM generator 635 on line 503. Signal 702 is an example of the recovered data signal (i.e., a PDM waveforrn) produced by PDM generator 635 on line 505 based on signals 700 and 701. The leading edge of signal 702 corresponds to the leading edge of the clock signal 701 received on line 502. The trailing edge of signal 702 corresponds to the trailing edge of the data signal 701 received on line 502. The recovered data signal produced on line 505 by PDM generator 635 is in a binary format.

Lowpass filter 630 extracts the data from the pulse train received on line 505. The upper cut-off frequency of the lowpass filter 630 is greater than one half of the data repetition rate, and equal to or less than the data repetition rate.

Level discriminator 637 receives the filtered signals via line 506 to produce the output signal on 507. The level discriminator 637 can be, for example, an analog-to-digital (A/D) converter with its quantization level equal to the number of signal symbols. The digital binary data produced by level discriminator 637 on line 507 can be provided to a FEC decoder 320 (shown in FIG. 1) and, in turn, to the parallel-to-serial converters 310 (shown in FIG. 1) which outputs the recovered payload data.

Embodiments of a PPM-PDM receiver system (such as the receiver system discussed in reference to FIG. 4) can have a very high amplitude noise rejection for optical signals with very short pulse rise times such as solitons, breathers and nondispersed chirped return-to-zero (CRZ) pulses.

As discussed above, certain multiple-level modulation schemes at particular modulation levels (i.e., at appropriate preselected M values) can provide a modulation gain exceeding the penalty associated with the respective modulation scheme. The penalty associated with the modulation scheme is the result of an increase in nonlinear distortion (i.e., an increase with respect to binary signals) experienced by the optical signals when transmitted over a highly nonlinear, long distance link. The specific penalty due to nonlinear distortion is a function of the specific modulation scheme, the signal spectrum and the signal power per channel. The following description illustrates the relationship between the particular modulation schemes at specific modulation levels and the resulting performance (and associated penalties) based on the signal jitter and maximum signal power.

Modulation schemes with multiple-level formatting can be compared to modulation schemes with binary formatting to determine whether the multiple-level formatting provides an improvement. In a fiber link with optical amplification where the receiver system uses direct detection, the predominant noise is amplified spontaneous noise (ASE) caused by the optical amplifiers within the fiber link. Under such conditions, the noise contribution of generated by the receiver itself (e.g., thermal noise and Schotky noise) can be neglected. Assuming, for example, Gaussian distribution of the ASE noise and an intensity-modulated binary channel with a 100% extinction ratio, the effective-signal-versus-noise-variance ratio, Q, is the following:

$$Q(SNRo) = \frac{2 \cdot SNRo \cdot \sqrt{\frac{Bo}{Bd}}}{1 + \sqrt{1 + 4 \cdot SNRo}}$$

where $SNR_o$ is the optical signal-to-noise ratio before the direct detection (square law) receiver, $B_o$ is the optical bandwidth of the receiver, and $B_d$ is the electrical bandwidth of the receiver (i.e., demodulator). See Humblet and Azizoglu, "On the Bit Error Rate of Lightwave Systems with Optical Amplifers," Journal of Lightwave Technology, vol. 9, no. 11, Nov. 1991; which is incorporated herein by reference.

A similar expression for modulation schemes using multiple-level formatting can also be provided. Again assume, for example, an optically amplified fiber link, Gaussian ASE, a receiver system using a square law detector, and a 100% extinction ratio. The expression for modulation formats of M-ary PSK on subcarrier using a and for M-ary PPM using a PLL discriminator are the same (see, e.g., the receiver systems discussed in reference to FIG. 3).

For these types of systems, the effective-signal-versus-noise-variance ratio, $Q_{PPM}$, is the following:

$$Q_{PPM}(SNRo) := \frac{2 \cdot sn(SNRo) \cdot \sin\left(\frac{\pi}{M}\right) \cdot \sqrt{\frac{Bo \cdot \zeta}{Bd}}}{\sqrt{\left[1 + 2 \cdot sn(SNRo) + 16 \cdot sn(SNRo)^2 \cdot x^2 \cdot \frac{\sigma_j^2}{(Ts^2 \cdot \zeta^2)} \cdot f(m)\right]}}$$

and $$f(m) := \cos(2 \cdot \pi \cdot m)^2 - 4 \cdot \pi \cdot \frac{\sigma_j}{Ts \cdot \zeta} \cdot \sin(2 \cdot \pi \cdot m) \cdot \cos(2 \cdot \pi \cdot m) + 4 \cdot \left(\frac{\pi \cdot \sigma_j}{Ts \cdot \zeta}\right)^2 \cdot \sin(2 \cdot \pi \cdot m)^2$$

where M is the number of symbols, $B_o$ is the optical bandwidth of the square law detector, $B_d$ is the demodulator low pass filter bandwidth, $\sigma_j$ is the subcarrier or pulse jitter, and ξ is the m-ary coefficient and m is the modulation index defined by:

$$\zeta := \frac{\log(M)}{\log(2)} \quad m := \frac{\pi \cdot 1}{2} \cdot \frac{M-1}{M}$$

For the modulation format of M-ary PPM using a PDM discriminator, the effective-signal-versus-noise-variance ratio, $Q_{PPM}$, is the following:

$$Q_{ppM}(SNRo) =$$

$$\frac{4 \cdot m \cdot (Be \cdot Ts)^2 \cdot SNRo \cdot \sqrt{\frac{2 \cdot Bo}{Bd}} \cdot \zeta^{\frac{5}{2}}}{\sqrt{1 + 2 \cdot Be \cdot Ts \cdot SNRo \cdot \zeta + (4 \cdot Ts \cdot \zeta \cdot Bc^2 \cdot SNRo)^2 \cdot \sigma_j^2}} \cdot f(M)$$

and $$f(M) = \frac{QppM(SNRo)}{[(M-1)^2 \cdot QppM(SNRo) + 2 \cdot (M-1)^2 \cdot \ln(M-1)]}$$

where M is the number of symbols, $B_o$ is the optical bandwidth of the square law detector, $B_e$ is the electrical bandwidth after the square law detector and before the discriminator, $B_d$ is the demodulator lowpass filter bandwidth, $\sigma_j$ is the subcarrier or pulse jitter, and ξ is the m-ary coefficient defined by:

$$\zeta := \frac{\log(M)}{\log(2)}$$

Figure 6:
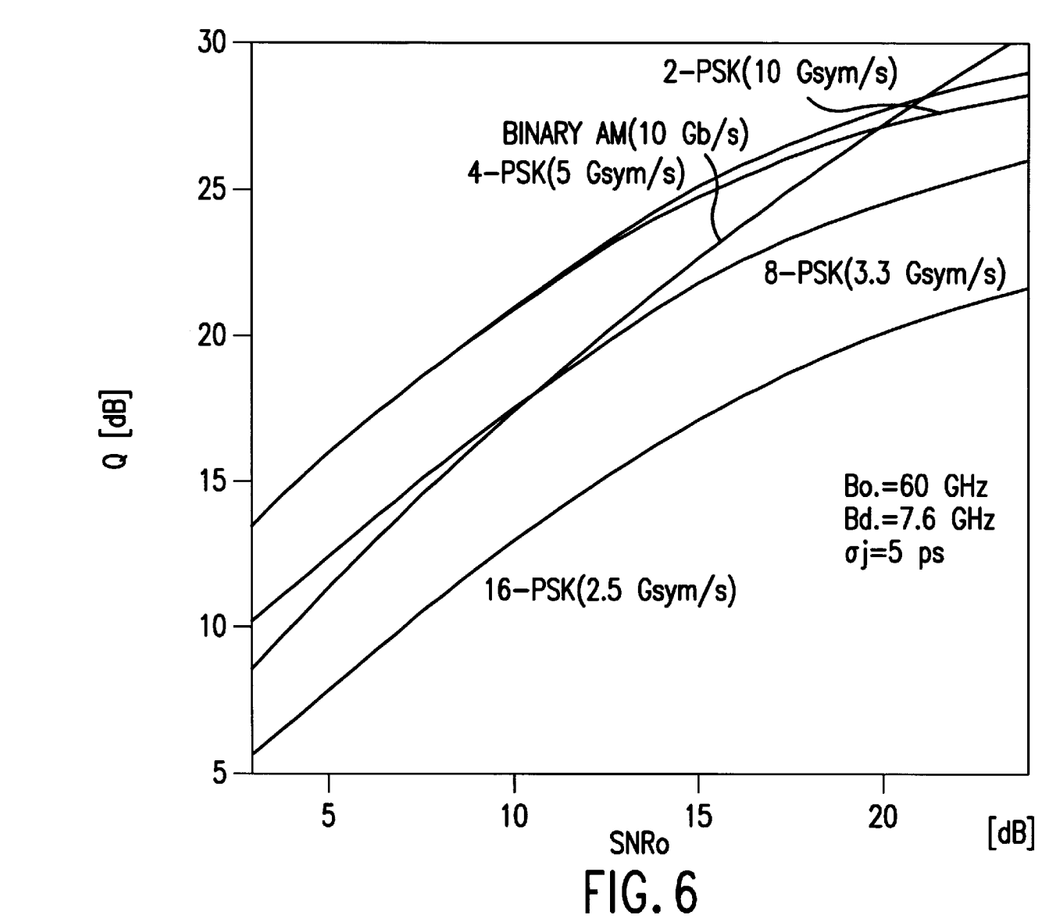
FIG. 6 illustrates system performance of an M-ary PPM receiver using a phase lock loop (PLL) discriminator and the system performance of an M-ary PSK on optical subcarrier receiver, according to embodiments of the present invention.
Figure 7:
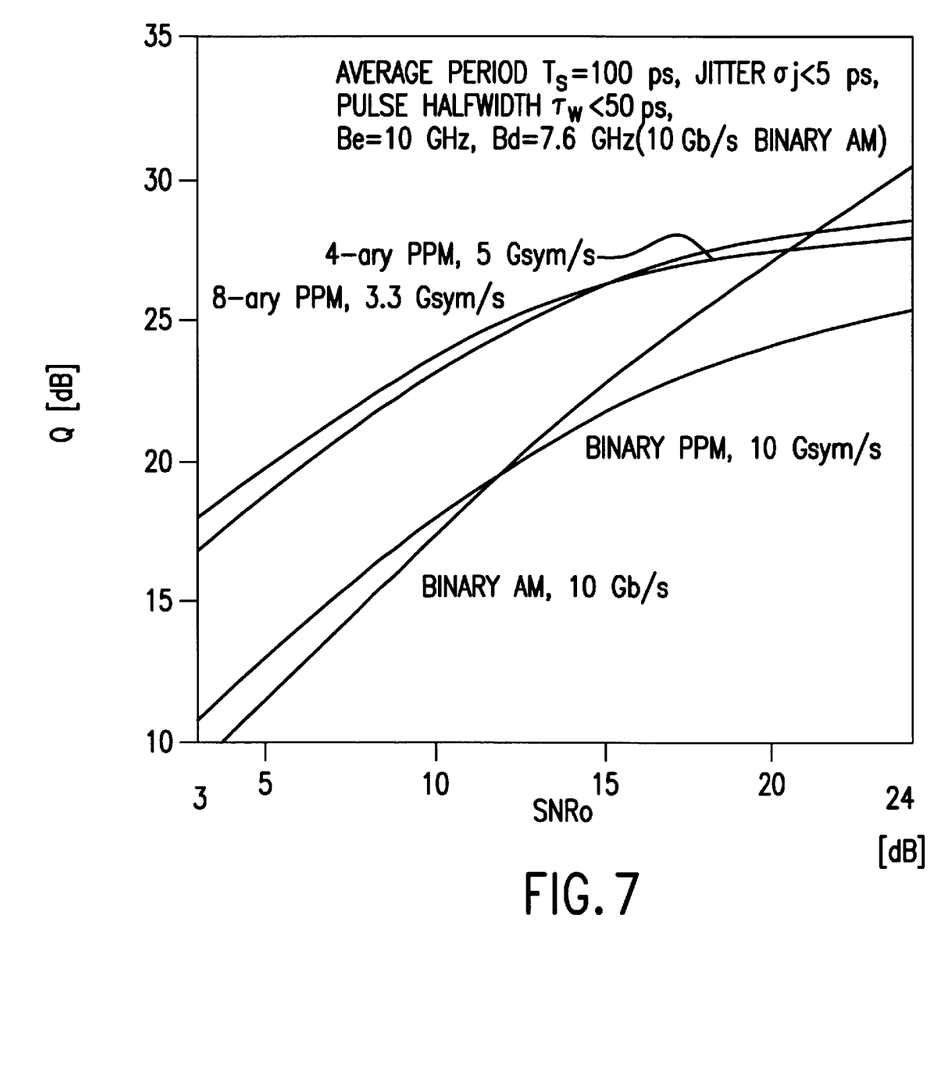
FIG. 7 illustrates system performance of an M-ary PPM receiver using a pulse duration modulation (PDM) discriminator, according to an embodiment of the present invention.

By using these expressions of Q as a function of $SNR_o$ for various modulation schemes and M values, the optimal M value can be preselected based on the signal jitter and maximum signal power. FIGS. 6 and 7 illustrates examples where the above expressions are used to preselect a M value.

The maximum signal power relates to the allowable channel spacing for a WDM system because the maximum signal power determines the signal bandwidth per channel. The channel spacing is a function of the signal bandwidth per channel as well as the nonlinear effects, such as FWM and cross-phase modulation (which are also related to the maximum signal power).

FIG. 6 illustrates system performance of an M-ary PPM receiver using a PLL discriminator and the system performance of an M-ary PSK on optical subcarrier receiver, according to embodiments of the present invention. As shown in FIG. 6, the Q factors for various modulation schemes are plotted as a function the signal-to-noise ratio (SNR). The types of modulation schemes consider in FIG. 6 are binary AM (10 Gb/s), 2-PSK and 2-PPM (10 Gsym/s), 4-PSK and 4-PPM (5 Gsym/s), 8-PSK and 8-PPM (5 Gsym/s), and 16-PSK and 16-PPM (2.5 Gsym/s). The values plotted in FIG. 6 are based on an optical bandwidth of 60 GHz, a data bandwidth of 7.6 GHz, and an optical jitter of 5 ps.

As FIG. 6 shows, certain modulation levels of a PPM receiver using PLL discrimination or a PSK on optical subcarrier receiver produce a sufficiently high modulation gain to overcome the associated penalties for highly nonlinear, long distant links. A 2-ary PPM using PLL modulation scheme and 2-ary PSK on optical subcarrier modulation scheme provide a modulation gain of about 5 dB for SNR's less than 19 dB. A 4-ary PPM using PLL modulation scheme and 4-ary PSK on optical subcarrier modulation scheme provide a modulation gain of about 5 dB for SNR's less than 20 dB. An 8-ary PPM using PLL modulation scheme and 8-ary PSK on optical subcarrier modulation scheme provide a modulation gain of about 2 dB for SNR's less than 12 dB. A 16-ary PPM using PLL modulation scheme and 16-ary PSK on optical subcarrier modulation scheme do not provide any modulation gain. These modulation gains shown in FIG. 6 are independent of any additional possible gain due to FEC encoding.

FIG. 7 illustrates system performance of an M-ary PPM receiver using a pulse duration modulation (PDM) discriminator, according to an embodiment of the present invention. As shown in FIG. 7, the Q factors for various modulation schemes are plotted as a function of the signal-to-noise ratio (SNR). The types of modulation schemes considered in FIG. 7 are binary AM (10 Gb/s), binary (10 Gsym/s), 4-PPM (5 Gsym/s), and 8-PPM (5 Gsym/s). The values plotted in FIG. 7 are based on an optical bandwidth of 10 GHz, a data bandwidth of 7.6 GHz, an optical jitter less than 5 ps, and a pulse half width less than 50 ps.

As FIG. 7 shows, certain modulation levels of a PPM receiver using PDM discrimination produce a modulation gain that exceeds the associated penalties for highly nonlinear, long distant links. A binary PPM using PDM modulation scheme provides a modulation gain of about 1 dB for SNR's at 10 dB. A 4-ary PPM using PDM modulation scheme provides a modulation gain of about 7 dB for SNR's at 7 dB. An 8-ary PPM using PDM modulation scheme provides a modulation gain of about 8 dB for SNR's at 7 dB. These modulation gains shown in FIG. 6 are independent of any additional possible gain due to FEC encoding.

The modulation gain provided by the various multiple-level modulation schemes at specific modulation levels can compensate for a reduction in the signal power of transmitted optical signals. In other words, the power requirements for an individual WDM channel can be satisfied at a lower signal power by compensating for the lower signal power using the modulation gain provided by the particular modulation schemes.

Because the signal power associated with each WDM channel is reduced, the potential sources of nonlinear distortion (such as cross phase or four wave mixing (FWM)) are correspondingly reduced. This reduction in potential sources of nonlinear distortion is particularly acute in optical systems having highly nonlinear links associated with, for example, either transoceanic-like distances or very long non-repeatered transoceanic optical fiber links.

Because the potential source of nonlinear distortion for each WDM channel is reduced, the WDM channels can be spaced more closely without adversely affecting system performance. The extent that the WDM channel density is increased is based on the extent that the potential sources of nonlinearities are reduced.

In sum, by selecting certain multiple-level modulation schemes at particular modulation levels, WDM channels for an optical system can be spaced more closely together where the optical system has a highly nonlinear link with a long distance, such as a non-repeatered transoceanic optical fiber link.

It should, of course, be understood that while the present invention has been described in reference to particular system configurations, other system configurations should be apparent to those of ordinary skill in the art. For example, although the receiver systems discussed in reference to FIGS. 3 and 4 are described in terms of analog components, receiver systems can be digital systems or include a combination of analog and digital components.

What is claimed is:

1. A method for transmitting optical signals modulated with data into a fiber link having a property of including nonlinear distortion of the optical signals as a function of signal power of the optical signals and distance traversed in the fiber link, comprising:

formatting the data with multiple-level pulse position modulation (PPM) signaling having a preselected M value to produce a plurality of formatted data signals; and multiplexing the plurality of formatted data signals to produce a plurality of wavelength-division (WDM) channels each carrying optical signals based on the formatted data signals, wherein each of said channels are nonlinear;

the preselected M value being based on signal jitter and maximum signal power.

2. The method of claim 1, wherein:

said formatting is performing by the following:

intensity modulating a carrier signal with a local-oscillator signal to produce a subcarrier signal; and multiple-level phase-shift keying (PSK) the subcarrier signal with the data.

3. The method of claim 1, wherein sources of the nonlinear distortion associated with the optical signals when propagating within the fiber link include Kerr effect, Brillouin scattering and Raman scattering.

4. The method of claim 1, wherein:

a spectral efficiency associated with the plurality of channels is greater than that associated with optical signals having a binary signal format.

5. The method of claim 1, wherein the fiber link is all optically amplified and the distance of the fiber link spans at least 1,500 km.

6. The method of claim 1, wherein the fiber link is a non-repeater link connected to a transmitter having a total output power greater than 15 dBm.

7. A transmitter for sending optical signals modulated with data, said transmitter coupled to a fiber link having a property of including nonlinear distortion of the optical signals as a function of signal power of the optical signals and distance traversed in the fiber link, said transmitter comprising:

a plurality of formatters receiving the data and configured to perform multiple-level pulse position modulation (PPM) signaling, each formatter from the plurality of formatters adapted to format data having a preselected M value, said plurality of formatters producing a plurality of formatted signals; and a multiplexer coupled to said plurality of formatters, said multiplexer receiving the plurality of formatted signals, said multiplexer producing a plurality of wavelength-division multiplex (WDM) channels each carrying optical signals based on the plurality of formatted signals, the preselected M value of the plurality of formatters being based on signal jitter and maximum signal power.

8. The transmitter of claim 7, wherein:
a carrier signal for each formatter from said plurality of formatters is intensity modulated with a local-oscillator signal to produce a subcarrier signal associated with that formatter, and
the carrier signal for that formatter is multiple-level phase-shift keyed (PSK) with the data.

9. The transmitter of claim 7, wherein sources of the nonlinear distortion associated with the optical signals when propagating within the fiber link include Kerr effect, Brillouin scattering and Raman scattering.

10. The transmitter of claim 7, wherein:
a spectral efficiency associated with the plurality of channels is greater than that associated with optical signals having a binary signal format.

11. The transmitter of claim 7, wherein the fiber link is all optically amplified and the distance of the fiber link spans at least 1,500 km.

12. The transmitter of claim 7, wherein the fiber link is a non-repeater link connected to a transmitter having a total output power greater than 15 dBm.

13. A method for receiving optical signals modulated with data from a fiber link having a property of including nonlinear distortion of the optical signals as a function of signal power of the optical signals and distance traversed in the fiber link, comprising:
demultiplexing a plurality of wavelength-division multiplex (WDM) channels each carrying optical signals to produce a plurality of formatted data signals, each of said channels being nonlinear; and
discriminating each formatted data signal from the plurality of formatted data signals with multiple-level signaling having a preselected M value to reproduce the data, said discriminating based on pulse position modulation (PPM) signaling using a phase lock loop;
the preselected M value being based on signal jitter and maximum signal power.

14. The method of claim 13, wherein:
said discriminating is based on pulse-duration modulation (PDM) signaling.

15. The method of claim 13, wherein:
said discriminating is based on multiple-level phase-shift keying (PSK) the plurality of subcarrier signals with the data.

16. The method of claim 13, wherein sources of the nonlinear distortion associated with the optical signals when propagating within the fiber link include Kerr effect, Brillouin scattering and Raman scattering.

17. The method of claim 13, wherein:
a spectral efficiency associated with the plurality of channels is greater than that associated with optical signals having a binary signal format.

18. The method of claim 13, wherein the fiber link is all optically amplified and the distance of the fiber link spans at least 1,500 km.

19. The method of claim 13, wherein the fiber link is a non-repeater link connected to a transmitter having a total output power greater than 15 dBm.

20. A receiver receiving optical signals modulated with data, said receiver coupled to a fiber link having a property of including nonlinear distortion of the optical signals as a function of signal power of the optical signals and distance traversed in the fiber link, said receiving comprising:
a demultiplexer receiving a plurality of wavelength-division multiplex (WDM) channels each carrying optical signals, said demultiplexer producing a plurality of formatted data signals; and
a plurality of discriminators coupled to said demultiplexer, said plurality of discriminators receiving the plurality of formatted data signals, said plurality of discriminators adapted to recover data with multiple-level signaling having a preselected M value, said plurality of discriminators reproducing the data, each of said discriminators further comprising:
a first mixer, said first mixer receives a formatted data signal from the plurality of formatted data signals and a first clock signal,
a second mixer, said second mixer receives the formatted data signal the plurality of formatted data signals and a second clock signal, and
a level discriminator coupled to said first mixer and said second mixer,
a first lowpass filter coupled to said first mixer; and
a second lowpass filter coupled to said second mixer;
the preselected M value of said data formatter being based on signal jitter and maximum signal power.

21. The receiver of claim 20, wherein said plurality of discriminators are adapted to recover data with multiple-level signaling having a preselected M value based on pulse position modulation (PPM) signaling using a phase lock loop.

22. The receiver of claim 20, wherein:
each discriminator from said plurality of discriminators includes:
a threshold detector, said threshold detector receives a formatted data signal form the plurality of formatted data signals,
a phase lock loop, said phase lock loop receives the formatted data signal form the plurality of formatted data signals, and
a pulse duration modulation generator coupled to said threshold detector and said phase lock loop.

23. The receiver of claim 20, wherein:
said plurality of discriminators are adapted to recover data with multiple-level signaling having a preselected M value based on pulse-duration modulation (PDM) signaling.

24. The receiver of claim 20, wherein:
said plurality of discriminators are adapted to recover data with multiple-level signaling having a preselected M value based on multiple-level phase-shift keying (PSK) the plurality of subcarrier signals with the data.

25. The receiver of claim 20, wherein:
said plurality of discriminators are adapted to recover data with multiple-level signaling having a preselected M value based on multiple-level phase-shift keying (PSK) the plurality of subcarrier signals with the data.

26. The receiver of claim 20, wherein sources of the nonlinear distortion associated with the optical signals when propagating within the fiber link include Kerr effect, Brillouin scattering and Raman scattering.

27. The receiver of claim 20, wherein:
a spectral efficiency associated with the plurality of channels is greater than that associated with optical signals having a binary signal format.

28. The receiver of claim 20, wherein the fiber link is all optically amplified and the distance of the fiber link spans at least 1,500 km.

29. The receiver of claim 20, wherein the fiber link is a non-repeater link connected to a transmitter having a total output power greater than 15 dBm.

* * * * *